United States Patent
Eric et al.

(10) Patent No.: US 7,182,923 B2
(45) Date of Patent: Feb. 27, 2007

(54) REACTION CHAMBER THAT COMPRISES A JACKET THAT CONTAINS AT LEAST ONE MODULE THAT IS CONNECTED BY FLEXIBLE MEANS TO THE JACKET AND THAT CONTAINS HEAT EXCHANGE MEANS

(75) Inventors: Lenglet Eric, Rueil Malmaison (FR);
Luc Nougier, Sainte Foy les Lyon (FR); Stéphane Bertholin, Villeurbanne (FR); Jacques Alagy, Charbonnieres (FR); Michel Cohen, Antibes (FR); Jean Luc Le Peutrec, Roquefort les Pains (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 618 days.

(21) Appl. No.: 10/259,796

(22) Filed: Sep. 30, 2002

(65) Prior Publication Data
US 2003/0118490 A1 Jun. 26, 2003

(30) Foreign Application Priority Data
Sep. 28, 2001 (FR) .................................. 01 12572

(51) Int. Cl.
*B01J 19/00* (2006.01)
*B01J 8/00* (2006.01)
(52) U.S. Cl. .................. 422/198; 422/129; 422/200; 422/240; 422/189; 422/193; 585/921; 208/46

(58) Field of Classification Search .................. None
See application file for complete search history.

(56) References Cited

U.S. PATENT DOCUMENTS

| | | | | |
|---|---|---|---|---|
| 3,236,662 | A * | 2/1966 | MacDowell | 501/6 |
| 3,334,971 | A * | 8/1967 | James et al. | 422/197 |
| 3,655,224 | A * | 4/1972 | Carberry et al. | 285/93 |
| 3,955,552 | A * | 5/1976 | von Wiesenthal | 126/110 R |
| 4,598,768 | A * | 7/1986 | Tenne | 165/165 |
| 5,321,191 | A | 6/1994 | Alagy et al. | |
| 5,333,681 | A * | 8/1994 | Jullien et al. | 165/82 |
| 5,554,347 | A | 9/1996 | Busson et al. | |

FOREIGN PATENT DOCUMENTS

| | | |
|---|---|---|
| FR | 2802119 | 6/2001 |
| JP | 60205071 A * | 10/1985 |

\* cited by examiner

*Primary Examiner*—Glenn A. Caldarola
*Assistant Examiner*—Jennifer A. Leung
(74) *Attorney, Agent, or Firm*—Millen, White, Zelano & Branigan, P.C.

(57) ABSTRACT

A device has a reaction chamber with at least one feed inlet (5) and at least one evacuation outlet (10). An outside jacket (2a) that is resistant to internal pressure is positioned around the device and contains at least one module (44) through which a reagent and formed products circulate. The module (44) has walls (11) and (12) made of refractory material that are included in a sealed jacket (40). The sealed jacket (40) is connected by a flexible connection to the jacket (2a) and to a heat exchanger that is also linked to the module (44) and to the jacket (2a) by a flexible connection.

14 Claims, 3 Drawing Sheets

REACTION CHAMBER THAT COMPRISES A JACKET THAT CONTAINS AT LEAST ONE MODULE THAT IS CONNECTED BY FLEXIBLE MEANS TO THE JACKET AND THAT CONTAINS HEAT EXCHANGE MEANS

BACKGROUND OF THE INVENTION

1. Field of the Invention

This invention relates to a chemical conversion device that comprises an outside chamber that contains at least one internal heat transfer module. The module comprises a preferably pressure-resistant metal jacket. This chamber generally comprises several modules that are connected to one another by flexible connecting means. All of these modules, through which at least one most often gaseous reagent is circulated, form a reactor. The invention was carried out in particular within the scope of the implementation of reactions that require at start-up either an input of calories or an input of kilogram calories. The applications of the reaction chamber of the invention for carrying out reactions are, for example, reactions of steam-cracking, pyrolysis, catalytic dehydrogenation, vaporeforming or water-vapor reforming, or thermal cracking, for example of hydrogen sulfide ($H_2S$). More particularly, the application of the invention is in carrying out endothermic reactions in which the reaction temperature is usually greater than about 250° C., often greater than about 350° C., and most often greater than about 500° C., and where one of the problems to be solved is to limit the secondary reactions that lead to the formation of tar and/or coke.

2. Description of the Prior Art

Many documents describe reactors that make it possible to work at high temperature, in general greater than about 350° C., and in a potentially coking environment where the catalytic effects of the metal walls should be avoided.

The reactor that was described in U.S. Pat. No. 5,554,347 comprises several rows of heating means and/or heat extraction means. This document describes: a reactor that comprises heating means that are fed by a mixture of combustible gas and oxygen carrier that make it possible to generate the power that is necessary for the reaction, and walls of a particular shape that make possible both an increase of the heat transfers because of between-wall radiative exchanges and a monitoring of the dwell time of gases in the reactor.

U.S. Pat. No. 5,321,191 that describes a reactor that is used for implementing a process for thermal pyrolysis of hydrocarbons comprising several rows of electric heating means encased by sheaths arranged in layers that are approximately parallel to one another and perpendicular to the axis of the reactor so as to define passages for the circulation of gas mixtures and/or effluents between the sheaths and/or between the sheaths and walls that separate two layers of parallel sheaths is also known.

The implementation of these technologies offers many advantages relative to previously developed ceramic technologies, for example the one that is described in U.S. Pat. No. 4,780,196 that relates to the steam-cracking of hydrocarbons in order to produce essentially light olefins, for example ethylene and/or propylene, as well as the one that is described in U.S. Pat. No. 4,973,777 that relates to the thermal conversion of methane into hydrocarbons of higher molecular weight.

According to the teaching of French Patent No. 2 802 119, a significant improvement that relates to the connecting means between the jacket of the reactor and the walls that are located on both sides of a heating pipe is also known. The improvement consists in the cooperation of a bellows, a packing box and a flange attached to the jacket of the reactor so as to ensure a relatively flexible connection between this jacket and a pipe that constitutes a heat exchange means. Such a connecting device is described as making it possible to limit the risks of the pipe rupturing in the cases where the latter becomes offset. Thus, a better sealing is ensured, which is reflected by a limitation of the loss of a portion of the reagents used in the reactor.

Relative to these teachings of the prior art, significant improvements can also be provided.

SUMMARY OF THE INVENTION

The invention thus relates to a device for chemical conversion of a feedstock that comprises in combination:

An outside chamber that comprises an inlet orifice and an outlet orifice,

A heat transfer module that comprises a metal jacket for confinement of the feedstock in a circulation pipe that comprises at least one wall that is made of refractory material and that comprises an inlet and an outlet to said pipe, Means for heat exchange with the feedstock that comprises an exchange surface that is arranged in said pipe, First flexible connecting means of heat exchange means to the chamber and to the metal jacket, Two flexible connecting means that connect the inlet orifices and the outlet orifices of the module respectively to the inlet orifices and outlet orifices of the chamber.

The device can comprise at least two heat transfer modules that are connected to one another by a third flexible connecting means.

The module can be supported by the chamber by a single attachment point.

The first, second, and third flexible connecting means can be elements that seal well enough to insulate, at least partially, the pipe from the space between the inside of the chamber and the outside of the metal jacket.

The flexible means can be in the form of metal or ceramic bellows.

The device can comprise means for feeding a fluid into the space between the inside of the chamber and the outside of the modules, under a pressure that is at least equal to the inlet pressure of the feedstock.

The first flexible means for connecting heat exchange means can comprise porous thermal insulation means and means for flushing these insulting means by a flow of the fluid that is obtained from the space between the inside of the chamber and the outside of the modules.

The exchange surface can be a radiant pipe that is fed by a gas burner.

BRIEF DESCRIPTION OF THE DRAWINGS

The invention will be better understood, and its advantages will emerge more clearly from reading the description of embodiments, in no way limiting, illustrated by the accompanying figures below, among which.

DETAILED DESCRIPTION OF THE PREFERRED EMBODIMENTS

Figure 1:
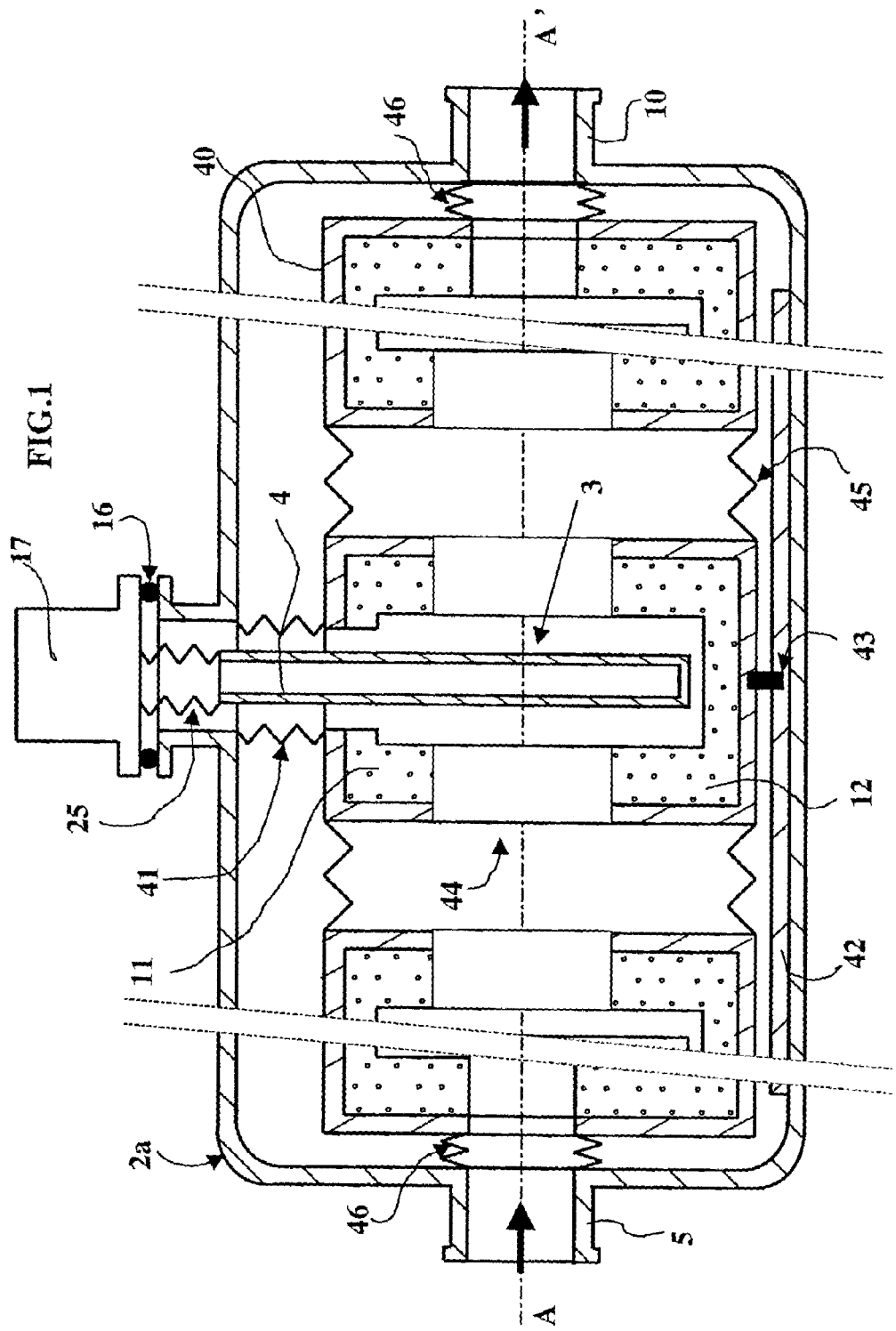
FIG. 1 shows a longitudinal view in diagrammatic section of a chamber according to the invention.

FIG. 1 shows a diagram of a chemical conversion device that comprises a reaction chamber of elongated shape along an axis (AA') that comprises at least one inlet or feed means (5) of at least one reagent and at least one outlet, or evacuation means (10), of effluents that contain the formed products and the non-transformed reagent. This chamber comprises an outside ring (2a) that contains several internal reactor modules (44) through which the reagent and the formed products circulate within a pipe or hollow inside volume (3). These heat transfer modules (44) are connected by a flexible means (41) that has the form of a bellows to outside ring (2a). Each module comprises a sealing jacket (40) that contains between walls (12) that are made of refractory material at least one heat exchange means (4) that has the form of a pipe that is connected indirectly by a flexible means (25) that has the form of a bellows to ring (2a) and to an outside heat source (17) that is integral with ring (2a) and that comprises joints or packing boxes (16) that ensure sealing relative to ring (2a). Each module is connected to the preceding one and to the following one by a means (45) that can support a differential expansion and that ensures a sealing between them. This means (45) as shown in a diagram in FIG. 1 is a flexible means that has the form of a bellows. Each module (44) is supported indirectly by ring (2a) and is kept in place by a centering pin (43) that works with a rail (42) that is integral with ring (2a). This attachment means at a single point of each of the modules makes possible differential expansions of the jacket without transferring or adding constraints between the module and the chamber. End modules (44), i.e., those that are placed close to the inlet and outlet of the chamber, are respectively connected in a sealed manner to the inlet of the reagent or reagents and to the outlet of the effluents by flexible means (46) that support a differential expansion between jacket (40) and chamber (2a) or between said means for input of the reagent or reagents and for output of the effluents. In the schematic diagram of FIG. 1, this connection has the form of a bellows (46) that ensures, in addition to its function relative to the sealing, a function that makes it possible to compensate a relative movement that is most often due to a differential expansion between the various elements and in particular between jacket (40) of module (44) and said ring (2a), or the means for input of the reagent or reagents. Flexible connection system (25) between heat exchange means (4) that is intended for heating and/or cooling, which is most often a radiant pipe that is intended for heating a pressurized reactor module, and ring (2a) of the chamber that contains said module is preferably a sealing connection system. Most often, pipe (4) is a radiant pipe (whose internal pressure is usually approximately equal to the atmospheric pressure) that is intended to heat a pressurized reactor module (i.e., whose internal pressure is essentially greater than the atmospheric pressure), and the chamber that contains said reactor module is usually used for implementing chemical reactions that take place within the modules. Pipe (4) can have an essentially constant section over its entire height such as the one that is shown in a diagram in FIG. 1 or can comprise, according to another embodiment that is not shown, in its lower portion a section restriction such that its diameter is then from about 10% to about 99%, often from about 20% to about 80%, and most often from about 40% to about 60% of the diameter of said pipe above said restriction. When this section restriction exists, its height is from about 0.05 times to about 2 times, often from about 0.1 times to about 1 times, and most often from about 0.25 times to about 0.75 times the diameter of said pipe above said restriction. This height can be, for example, on the order of 100 millimeters.

The outside of the modules and the inside of the chamber thus define an insulated space from:

The outside thanks to the chamber;

Pipes of reactors, or modules, by bellows or the equivalent (46, 45);

Means for heat exchange (4) by bellows 41 and 25.

This annular space can be used to maintain there a pressure of a neutral fluid with regard to chemical reactions so as to monitor possible leaks by applying pressure that is slightly higher than that which prevails in the reactor modules and/or in heat exchange pipes (4).

Figure 2:
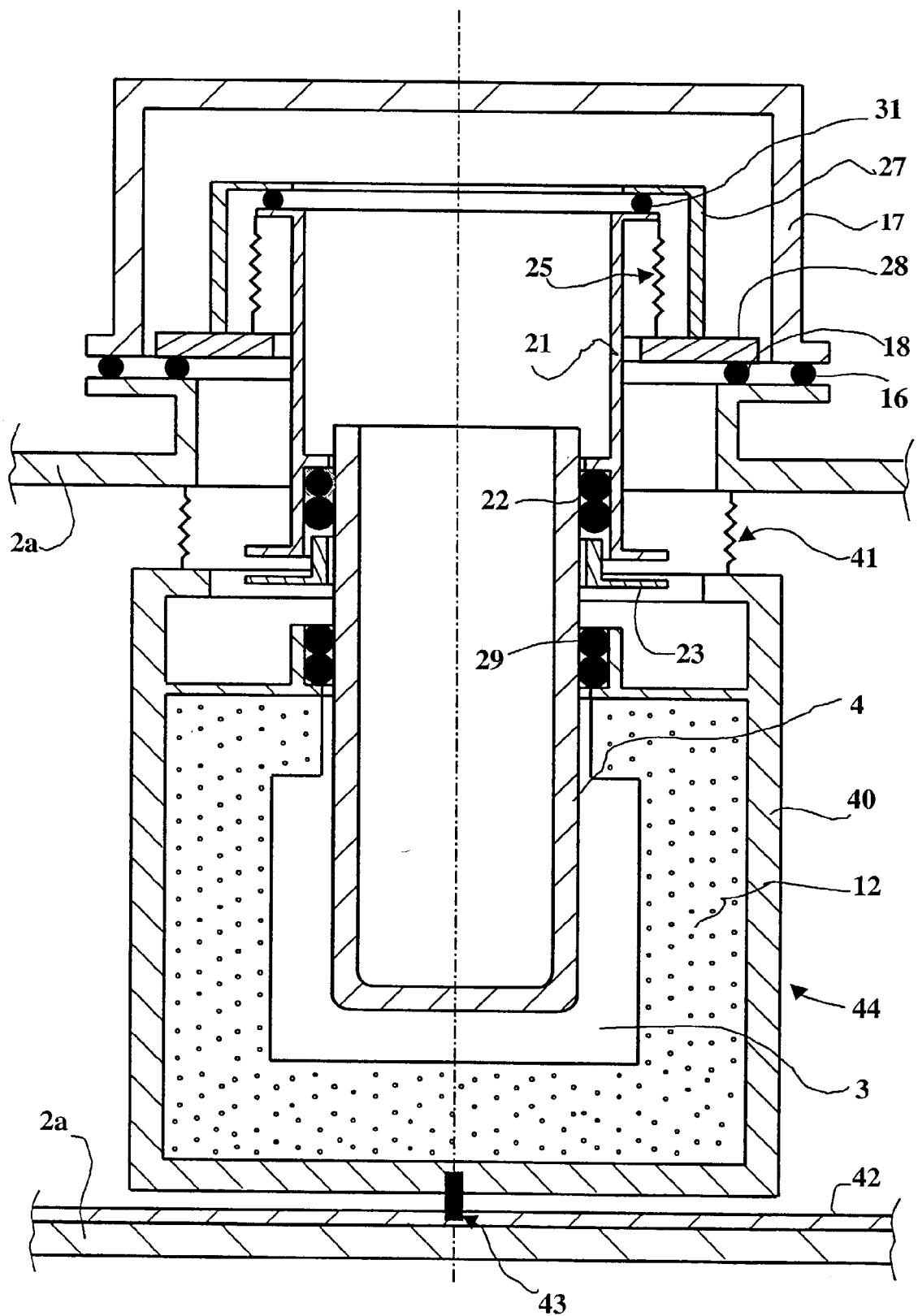
FIG. 2 shows in section a view of a heat exchange element.

FIG. 2 shows a more detailed diagram of various elements of the chamber comprising a module (44) that comprises a heat exchange element that has the form of a pipe (4) and connections of these elements with ring (2a) of the chamber and outside heat source (17). The means for connection between radiant pipe (4) and ring (2a) of the chamber comprise a packing box (21, 22, 23) and a flange (28) that is attached to ring (2a) of the chamber via a joint (18). A bellows or expansion joint (25) is placed between packing box (21, 22, 23) and a bracket (27) that is connected to said flange (28) so as to ensure a relatively flexible connection between radiant pipe (4) and ring (2a) of the chamber. This bellows an expansion joint (25) is thus located above flange (28) in an axial position relative to the axis of radiant pipe (4). Packing box (21, 22, 23) comprises an element for anchoring the bellows and means (not shown) that are installed for limiting the axial movements while allowing small-amplitude radial movements of entire radiant pipe (4) and said packing box. The connection between bracket (27) and packing box (21, 22, 23) comprises a non-sealing joint (31) that defines a section restriction between these two elements that allows, if necessary, the passage of a gas mixture that is contained in radiant pipe (4), in particular in the case of a sudden pressure variation inside pipe (4) toward the outside of pipe (4). Radiant pipe (4) comprises a guide means relative to the walls that are made of refractory material (11) or (12) (only walls 12 are shown in FIG. 2) that are located on both sides of radiant pipe (4). This means is formed by a cornerstone that comprises a recess that is intended to accommodate at least one bearing (29) between said pipe (4) and said cornerstone. The reagent or reagents and the formed products circulate within a pipe or hollow inside volume (3) and heat exchange with radiant pipe (4). Pipe (4) and walls (11) and (12), located on both sides of radiant pipe (4), are confined inside a sealing jacket (40) that is connected by a flexible connecting means (41) that has the form of a bellows to ring (2a) of the chamber. This bellows is found in a relatively cold zone and ensures in particular a sealing function. Jacket (40) of module (44) rests on a rail (42) that is connected to ring (2a) and comprises a single anchoring point (43) that ensures a fixed position of a module within the chamber.

Figure 3:
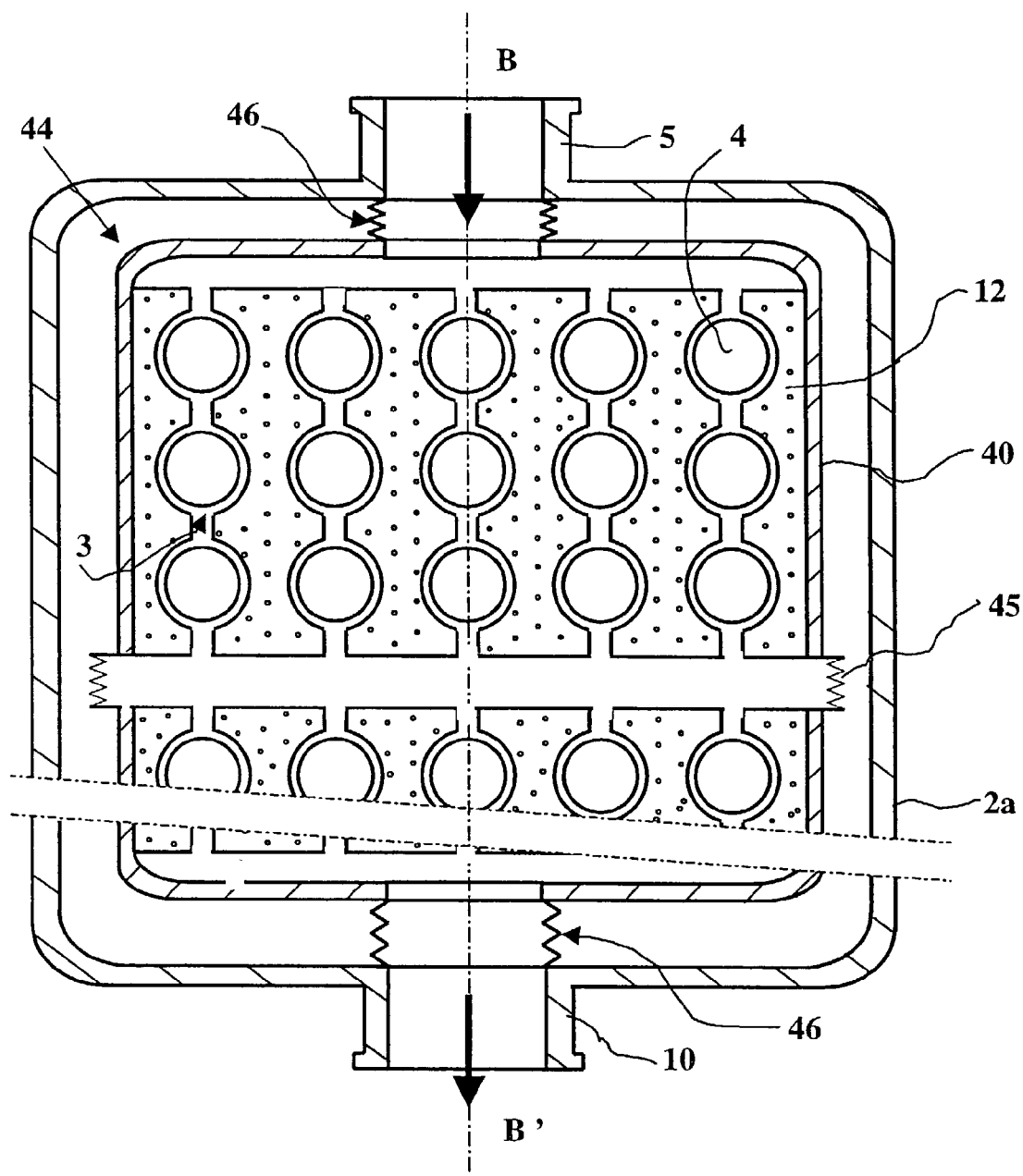
FIG. 3 shows a top view in section of a chamber according to the invention.

FIG. 3 shows a top view in section of the elongated reaction chamber along an axis (B B'). The chamber comprises at least one feed means (5) of at least one reagent and at least one means (10) for evacuating effluents that contain formed products and the non-transformed reagent. This chamber comprises an outside ring (2a) that contains several internal reactor modules (44) through which circulate the reagent and the formed products within a hollow inside volume (3) that generally consists of several pipes that are provided by the walls that are made of refractory material and the heat exchange surfaces. This internal volume contains heat exchange means (4). This internal volume is defined by two successive walls that are made of refractory material (11) or (11) and (12). These walls are included inside of a sealing jacket (40). Each module (44) is connected to next module (44) by a flexible means (45) that has the form of a bellows. Modules (44) are connected in a sealed manner at the ends of the chamber respectively to the inlet of the reagent or reagents and to the outlet of the effluents according to the schematic diagram of FIG. 3. This connection has the form of a bellows (46).

Each reactor module (44) usually comprises, in the case of the implementation of chemical reactions that require at least at start-up an input of calories, a series of elements that makes possible at least in a first zone an input of heat that is necessary to the start-up of the reaction. This chamber can be used for globally exothermic reactions that require, however, the input of calories at start-up, such as, for example, the catalytic hydrogenation reactions. This chamber is more particularly applicable for the implementation of any endothermic reaction but more particularly for the implementation of reactions of steam-cracking, pyrolysis, catalytic dehydrogenation and catalytic vaporeforming of hydrocarbons or hydrocarbon fractions in which the reaction temperature is most often greater than about 350° C. and where one of the problems to be solved is to limit the secondary reactions that result in the formation of tar and/or coke.

Walls (11) and (12) that are inside each module (44) play an important role in heat exchange, since they can absorb the radiation that is emitted by the jackets of the heat exchange means and consequently the temperatures of these jackets and walls have a tendency to attain equilibrium. It is then possible to increase in particular the exchange surface and virtually to double it by designing the device in a particular manner. Actually, although the heat exchange means can be placed in staggered rows, it is preferable, in order to increase the exchange surface, to arrange these heat exchange means so that they are aligned, which makes it possible to constitute n rows of m heat exchange means in the direction of the length (for a total number of heat exchange means that is equal to (n×m); thus at least one longitudinal zone that contains at least one reactor module and most often at least two longitudinal zones that each contain at least one reactor module, whereby each module comprises at least one and often several layers of heat exchange means and whereby each longitudinal zone is separated from the next by a wall that is made of refractory material, will be formed. It thus is possible to increase the heat exchange surface by an optimized surface, such as, for example, by the addition of flanges on the outside jackets of the heat exchange means that take part in the heat transfer.

By radiation, the temperature of these walls increases and has a tendency to reach a value that is very close to that of the outside jackets of heat exchange means (4). These walls will therefore also take part in the gas heating process by convection. Thus, in this embodiment, whereby the exchange surface is significantly increased, it will be possible to obtain the same temperature of process gas with a temperature of the outside jackets of the heat exchange means and wall with a thickness that is relatively smaller, which consequently makes possible a reduction of the coke formation. In a particular embodiment, each longitudinal zone can comprise a single row of heat exchange means.

According to these two embodiments, the convective exchanges between the process gas and the walls are broadly increased, and they can be further improved by imposing high speeds on the process gas and by creating turbulence zones. Increasing the process gas speed can be obtained, for example, by using walls whose shape promotes this speed increase and the appearance of turbulence zones. Walls of particular shapes are shown in FIG. 3.

The walls are usually made of refractory material. All refractory material, and in particular the mineral refractory materials, such as, for example, the ceramic materials, can be used to produce the walls. It is possible to cite by way of examples zirconium, silicon carbide, mullite and various refractory concretes. In some cases, metallic materials that resist temperatures that are higher than 700° C. can also be used. They can sometimes have a ceramic coating.

FIG. 3 shows, according to an embodiment, a chamber with an elongated shape and a rectangular section comprising an inlet orifice (5) that makes it possible to feed said reactor modules that are contained in said chamber with a reaction gas mixture. These reactor modules comprise heat exchange means (4) (whereby each comprises an outside jacket) that are placed in rows of layers that are essentially parallel and that form in a plane (plane of the figure) a bundle with a square pitch. These modules define transversal heating or cooling sections that are essentially perpendicular to the axis (BB') of the chamber. These rows are separated from one another by walls (11) that are advantageously made of ceramic material and that are essentially parallel to the axis of the reactor. These walls (11) have a suitable form for creating recesses at each heat exchange means (4). The distance that separates two adjacent heat exchange means (4) is not very critical but is small enough, however, for questions of dwell time and thermal flow density to be ensured. It is usually from about 2 mm to about 200 mm. The rows of heat exchange means (4) are separated by a wall that is made of, for example, refractory concrete. The distance between heat exchange means (4) and the walls or dimension of passages is usually small enough to ensure a good contact of the reaction gas mixture with the outside surface of the jacket of heat exchange means (4). It is usually from about 1 mm to about 100 mm, and preferably from about 2 mm to about 50 mm. In their most narrow portion, the walls have a thickness that is relatively small but enough to ensure the good mechanical behavior of these walls. It is usually from about 2 mm to about 300 mm, and preferably from about 5 mm to about 50 mm. At the outlet of the heating zone, the effluents of the reaction can be cooled in a cooling zone that is often formed from one or more modules (44) that contain heat exchange means that are connected to an outside source of kilogram calories. It is thus possible to provide, either at the outlet of the chamber, or in the chamber with a particular means of sealing connection with last module (44), a contact with a quenching agent that is introduced via, for example, injectors that are placed at the periphery of the chamber and that are connected to an outside source, not shown, of the quenching agent. This quenching device by direct contact can be replaced or completed by a device for indirect quenching by contact with a cooled wall outside of the chamber or as the one is mentioned above by one or more module(s) (44) that are dedicated to indirect cooling of the reaction effluents. All of the effluent gases are cooled then collected by an orifice (10) at the end of the chamber.

The reactions that are used in this type of chamber are usually carried out under a pressure that is higher than the atmospheric pressure that is often from about 0.01 bar (1 bar is equal to 0.1 MPa) to about 30 bar and most often from about 0.5 bar to about 10 bar. The necessity of working under pressure imposes the use of a sealing connection device between pipe (4) and the element for attachment of said pipe to ring (2a). To illustrate in a simplified and more diagrammatical way the production of sealing, FIG. 2 shows ring (2a) of the chamber that comprises a flange (28) that supports bracket (27) that ends pipe (4) in its upper portion. The sealing is done by crushing joint (18). This sealing means is installed to prevent leaks toward the outside of the chamber but also leaks that stem from the inside of the reactor module toward the inside of pipe (4). Pipe (4) is a radiant pipe on top of which is a burner that is shown in FIG. 2 by its upper portion (17) and that comprises connecting means via a joint (16) that ensures the sealing with ring (2a).

In many cases of use, and more particularly in the pyrolysis chambers of chemical molecules, the radiant pipes can be brought to temperatures that are equal to or greater than about 800° C., and often equal to or greater than 1000° C., and can even reach temperatures as high as 1500° C.

The chamber according to the invention is particularly well suited to the reactor module case in which pipe (4) is a pipe that is made of ceramic material, positioned between walls (11) and/or (12) that are located on both sides of pipe (4) and that are themselves made of refractory material, such as, for example, a ceramic material. Said pipe (4) is connected to or attached to the metal jacket of a chamber that is used for implementing chemical reactions. According to a preferred embodiment, the device of the invention is particularly well suited to the case where pipe (4) and walls (11) and (12) are made of a ceramic material, for example zirconium or silicon carbide, whereby the latter material is the one that is preferably used. This chamber is more particularly usable in the case where the reactor modules are reactor modules for catalytic hydrogenation, steam-cracking, pyrolysis, catalytic dehydrogenation and catalytic steam reforming of hydrocarbons or hydrocarbon fractions in which the reaction temperature is often greater than about 350° C. and can reach values as high as 1500° C. as mentioned above. The pyrolysis reactions that can be used in the chamber are, for example, reactions for pyrolysis of hydrocarbons, pyrolysis of hydrogen sulfide and pyrolysis of ammonia.

According to a particular, preferred embodiment of the invention, the axis of pipe (4) is kept approximately perpendicular to the axis of the reactor, i.e., to the direction of flow of the reaction gas mixture. This pipe is held by one or more bearing(s) (29) that do not have the additional function of ensuring the sealing and can be elements whose heat resistance is not a main criterion of choice. It goes without saying, however, that these bearings (29) should be able to support a high temperature virtually on the order of magnitude of the temperature of pipe (4). They can therefore be used longer without requiring the user to stop the installation to change them, as is the case of the bearings that are described in Patent Application French Patent No. 2 802 119 that ensure both holding the pipe and sealing. In the case of this invention, sealing is ensured via connecting means (41) between reactor module (44) and ring (2a) of the chamber. A certain advantage in this case is linked to the fact that the means ensuring the sealing is found in a relatively cold zone that is far from radiant pipe (4).

The preceding examples can be repeated with similar success by substituting the generically or specifically described reactants and/or operating conditions of this invention for those used in the preceding examples.

The entire disclosure of all applications, patents and publications, cited above and below, and of corresponding French Application No. 01/12.572, filed Sep. 28, 2001 is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A device amenable to chemical conversion of a feedstock, said device comprising in combination:
    an outer chamber envelope (2a) comprising an inlet orifice (5) and an outlet orifice (10);
    an assembly of modules comprising at least two heat transfer modules (44) configured in series, said assembly being disposed within said outer chamber envelope (2a), each of said heat transfer modules comprising a metal jacket (40) housing a circulation pipe (3), an inlet and an outlet to said circulation pipe, and
    at least one wall (11, 12) made of refractory material, wherein the inlet of a first heat transfer module in the series of heat transfer modules defines an inlet orifice of the assembly of modules, and wherein the outlet of a final heat transfer module in the series of heat transfer modules defines an outlet orifice of the assembly of modules;
    each of said heat transfer modules including heat exchange means (4) comprising an exchange surface arranged in said pipe;
    first flexible connecting means (41) for collectively connecting said metal jacket (40) of each of said heat transfer modules to said outer chamber envelope (2a); and
    second flexible connecting means comprising two flexible means (46) for connecting the inlet orifice of the assembly of modules to the inlet orifice of the outer chamber envelope (2a) and for connecting the outlet orifice of the assembly of modules to the outlet orifice of the outer chamber envelope (2a), wherein two consecutive heat transfer modules are connected to one another such that the outlet of a preceding heat transfer module is connected to the inlet of a successive heat transfer module by a third flexible connecting means (45).

2. A device according to claim 1, in which each of said heat transfer modules is supported by the outer chamber envelope (2a) by a single attachment point (43).

3. A device according to claim 2, in which said first, second and a third flexible connecting means comprise elements that are sealed so as to insulate, at least partially, said pipe in each heat transfer module from the space between the inside of the outer chamber envelope (2a) and the outside of said metal jacket of each heat transfer module.

4. A device according to claim 3 wherein for each module, the corresponding first flexible connecting means surrounds the heat exchange means.

5. A device according to claim 3 wherein for each module, the corresponding heat exchange means (4) is connected by fourth flexible connecting means 25 to one external heat source that is integral with the chamber envelope (2a).

6. A device according to claim 1, in which at least one of said flexible connecting means are in the form of metallic or ceramic bellows.

7. A device according to claim 6, wherein the bellows are metallic.

8. A device according to claim 1 comprising means for feeding a fluid into the space that is between the inside of the outer chamber envelope (2a) and the outside of the heat transfer modules, under a pressure that is at least equal to the inlet pressure of the feedstock.

9. A device according to claim 8, in which said first flexible connecting means (41) comprise porous thermal insulation means and means for flushing these insulating means by a flow of fluid that comes from the space that is included between the inside of the outer chamber envelope (2a) and the outside of the heat transfer modules.

10. A device according to claim 1, in which said exchange surface comprises a radiant pipe, and further comprising a gas burner for heating said radiant pipe.

11. A device according to claim 1, in which said first flexible connecting means (41) comprises porous thermal insulation means and means for flushing these insulating means by a flow of fluid that comes from the space that is included between the inside of the outer chamber envelope (2a) and the outside of each of the heat transfer modules.

12. A device according to claim 11, in which at least one of said flexible connecting means are in the form of metallic or ceramic bellows.

13. A process for the chemical conversion of a feedstock, said process comprising the steps of:
   providing the device of claim 1;
   supplying a feedstock to the series of heat transfer modules (44) via the inlet orifice (5) of the outer chamber envelope (2a) and the inlet orifice of the assembly of modules;
   reacting the feedstock within the series of heat transfer modules (44); and
   discharging the reacted feedstock from the series of heat transfer modules (44) via the outlet orifice of the assembly of modules and the outlet orifice (10) of the outer chamber envelope (2a);
   wherein the step of reacting the feedstock comprises at least one reaction selected from the group consisting of catalytic hydrogenation, steam cracking, catalytic dehydrogenation, catalytic steam reforming, pyrolysis of hydrocarbons, pyrolysis of hydrogen sulfide and pyrolysis of ammonia.

14. A device amenable to conversion of feedstock in catalytic hydrogenation, steam cracking, catalytic dehydrogenation, catalytic steam reforming, pyrolysis of hydrocarbons, pyrolysis of hydrogen sulfide or pyrolysis of ammonia reactions, said device comprising in combination:
   an outer chamber envelope (2a) comprising an inlet orifice (5) and an outlet orifice (10);
   an assembly of modules comprising at least two heat transfer modules (44) configured in series, said assembly being disposed within said outer chamber envelope (2a), each of said heat transfer modules comprising a metal jacket (40) housing a circulation pipe (3), an inlet and an outlet to said circulation pipe, and at least one wall (11, 12) made of refractory material, wherein the inlet of a first heat transfer module in the series of heat transfer modules defines an inlet orifice of the assembly of modules, and wherein the outlet of a final heat transfer module in the series of heat transfer modules defines an outlet orifice of the assembly of modules;
   each of said heat transfer modules including heat exchange means (4) comprising an exchange surface arranged in said pipe;
   first flexible connecting means (41) for collectively connecting said metal jacket (40) of each of said heat transfer modules to said outer chamber envelope (2a); and
   second flexible connecting means comprising two flexible means (46) for connecting the inlet orifice of the assembly of modules to the inlet orifice of the outer chamber envelope (2a) and for connecting the outlet orifice of the assembly of modules to the outlet orifice of the outer chamber envelope (2a), wherein two consecutive heat transfer modules are connected to one another such that the outlet of a preceding heat transfer module is connected to the inlet of a successive heat transfer module by a third flexible connecting means (45).

* * * * *